(12) United States Patent
Newman et al.

(10) Patent No.: US 8,802,740 B2
(45) Date of Patent: *Aug. 12, 2014

(54) ENVIRONMENTALLY FRIENDLY DEMULSIFIERS FOR CRUDE OIL EMULSIONS

(75) Inventors: Steven P. Newman, Southampton (GB); Carl Hahn, Sugar Land, TX (US); Robert D. McClain, Keller, TX (US)

(73) Assignee: Nalco Energy Services L.P, Sugar Land, TX (US)

( * ) Notice: Subject to any disclaimer, the term of this patent is extended or adjusted under 35 U.S.C. 154(b) by 368 days.

This patent is subject to a terminal disclaimer.

(21) Appl. No.: 12/489,079

(22) Filed: Jun. 22, 2009

(65) Prior Publication Data

US 2009/0259004 A1    Oct. 15, 2009

Related U.S. Application Data

(63) Continuation of application No. 11/017,390, filed on Dec. 20, 2004, now Pat. No. 7,566,744.

(51) Int. Cl.
| | |
|---|---|
| *C08G 65/28* | (2006.01) |
| *C08G 65/26* | (2006.01) |
| *B01D 17/05* | (2006.01) |
| *C08G 69/44* | (2006.01) |

(52) U.S. Cl.
USPC .......... 516/189; 516/191; 210/708; 528/300; 528/301; 528/302; 528/417

(58) Field of Classification Search
USPC ............ 516/179, 161, 189, 191; 528/417, 76, 528/300, 301, 85, 302; 210/708
See application file for complete search history.

(56) References Cited

U.S. PATENT DOCUMENTS

| | | | | |
|---|---|---|---|---|
| 3,594,393 | A * | 7/1971 | Bariks et al. | 516/179 |
| 4,038,296 | A * | 7/1977 | Greif et al. | 554/223 |
| 4,098,692 | A * | 7/1978 | Baker et al. | 516/187 |
| 4,183,821 | A * | 1/1980 | Langdon et al. | 516/191 |
| 4,202,957 | A * | 5/1980 | Bonk et al. | 528/77 |
| 4,440,902 | A * | 4/1984 | Diery et al. | 525/404 |
| 4,762,899 | A * | 8/1988 | Shikinami | 528/49 |
| 5,153,259 | A * | 10/1992 | Padget et al. | 524/591 |
| 5,371,131 | A * | 12/1994 | Gierenz et al. | 524/394 |
| 5,936,045 | A * | 8/1999 | Warzelhan et al. | 525/437 |
| 6,399,735 | B1 * | 6/2002 | Fischer et al. | 528/76 |
| 6,787,628 | B2 * | 9/2004 | Thetford et al. | 528/76 |
| 7,041,707 | B2 * | 5/2006 | Hahn | 516/158 |
| 2004/0147407 | A1 * | 7/2004 | Hahn | 507/200 |
| 2004/0176537 | A1 * | 9/2004 | Armentrout et al. | 525/88 |

FOREIGN PATENT DOCUMENTS

| | | |
|---|---|---|
| EP | 0 429 892 A2 | 6/1990 |
| WO | WO 02/38645 A1 * | 5/2002 |
| WO | WO 2004/067594 A2 | 8/2004 |

OTHER PUBLICATIONS

Schmalz et al, "Morphology, Surface Structure, and Elastic Properties of PBT-Based Copolyesters with PEO-b-PEB-b-PEO triblock Copolymer Soft Segments", Macromolecules 2002, 35, 5491-5499 (published on the web—Jun. 6, 2002).*

Kuwamura et al, Surface active block copolymers: I. The preparation and some surface active properties of block copolymers of tetrahydrofuran and ethylene oxide, Journal of the American Oil Chemists' Society, vol. 48, Issue 1, (Jan. 1971), pp. 29-34.*

* cited by examiner

*Primary Examiner* — Daniel S Metzmaier

(74) *Attorney, Agent, or Firm* — Edward O. Yonter

(57) ABSTRACT

The present invention provides environmentally friendly demulsifiers for the breakdown of petroleum oil applications. The demulsification formulations of the present invention are biodegradable and are low in toxicity. The demulsifiers include a poly(tetramethylene glycol) and an alkylene glycol copolymer linked to the poly(tetramethylene glycol) by a difunctional coupling agent.

4 Claims, No Drawings

ENVIRONMENTALLY FRIENDLY DEMULSIFIERS FOR CRUDE OIL EMULSIONS

CROSS-REFERENCE TO RELATED APPLICATIONS

This application is a continuation application of U.S. patent application Ser. No. 11/017,390, now U.S. Pat. No. 7,566,744, which was filed on Dec. 20, 2004.

FIELD OF THE INVENTION

The present invention generally relates to water-in-oil demulsification formulations that are biodegradable and low in toxicity. In particular, this invention relates to environmentally friendly demulsifiers for the breakdown of hydrocarbon-water emulsions encountered in crude oil production and other petroleum applications.

BACKGROUND OF THE INVENTION

Formation of emulsions comprising oil and water commonly occur in the extraction, production and processing/refining of petroleum oil. It is often necessary to separate the water from the oil in order to effectively prepare the oil for further processing and/or refinement. A plethora of demulsifiers are known in the art for removing water from such emulsions. Demulsifiers are typically composed of one or more surfactants dispersed in a solvent system and may be derived from alcohols, fatty acids, fatty amines, glycols and alkylphenol condensation products, for example.

The ecological impact of offshore crude oil extraction has been subject to increasing scrutiny. Several international and national environmental regulatory agencies have determined that demulsifiers containing nonylphenol alkoxylates and related compounds have a deleterious effect on the marine environment. Moreover, conventional demulsifier chemicals typically do not meet a biodegradation level of greater than 20% as established by these regulatory agencies. Consequently, the likelihood exists that a vast majority of conventional demulsifiers will be banned from offshore use in the near future.

A need therefore exists for petroleum oil demulsifiers with an improved environmental profile. In particular, a need exists for environmentally friendly water-in-oil demulsifiers that are biodegradable and have a low toxicity in the marine environment.

SUMMARY OF THE INVENTION

The present invention is directed to environmentally friendly demulsifiers for the breakdown of hydrocarbon-water emulsions encountered in crude oil production and other petroleum applications. The demulsification formulations of the present invention meet or exceed regulatory standards for biodegradability and aquatoxicity (i.e., the present demulsifiers are non-mutagenic, non-reprotoxic or endocrine disrupting). In an embodiment, the present invention provides a water-in-oil demulsifier that includes a poly(tetramethylene glycol) and an alkylene glycol copolymer linked to the poly(tetramethylene glycol) by a difunctional coupling agent. The demulsifier may have the following formula:

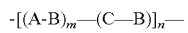

wherein A is the poly(tetramethylene glycol), B is the difunctional coupling agent and C is the alkylene glycol copolymer, m is from about 0.01 to about 100 and n is an integer from 1 to about 100. The difunctional coupling agent may be a carboxylic diacid or a difunctional isocyanate. A carboxylic diacid coupling agent produces a polyester demulsifier whereas a difunctional isocyanate coupling agent produces a polyurethane demulsifier. The alkylene glycol copolymer may be composed of poly(ethylene glycol), poly(propylene glycol) and/or poly(butylene glycol). In an embodiment, the poly(tetramethylene glycol) is a poly(tetrahydrofaran). In a further embodiment, the alkylene glycol copolymer is a block copolymer composed of polyethylene glycol) and poly(propylene glycol).

In another embodiment of the present invention, the alkylene glycol copolymer may include an alkoxylated amine, the alkoxylated amine having the formula:

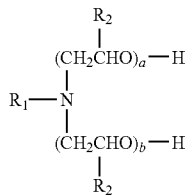

wherein $R_1$ is selected from the group consisting of an alkyl radical having from 1 to about 23 carbon atoms and an alkylene radical having from 1 to about 23 carbon atoms, $R_2$ is H or $CH_3$ and can take both meanings, and a and b independently range from 1 to about 50. In this embodiment, the demulsifier includes a poly(tetramethylene glycol) and an alkoxylated amine linked to the poly(tetramethylene glycol) by a difunctional coupling agent. The demulsifier has the following formula:

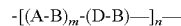

wherein A is the poly(tetramethylene glycol), B is the difunctional coupling agent and D is the alkoxylated amine, m is in the range from about 0.01 to about 100, and n is an integer in the range from 1 to about 100. The difunctional coupling agent may be a carboxylic diacid. The alkoxylated amine has the same formula as set forth above.

In another embodiment, the present invention provides a method for resolving or breaking an emulsion comprising oil and water. The method includes contacting the emulsion with any of the demulsifiers described herein. Thus, the present invention contemplates a method that contacts an emulsion with a demulsifier composed of 1) a poly(tetramethylene glycol) and an alkylene glycol copolymer linked thereto by a difunctional coupling agent; 2) a poly(tetramethylene glycol) and an alkylene glycol copolymer that includes an alkoxylated amine, the alkylene glycol copolymer-alkoxylated amine linked to the poly(tetramethylene glycol) by a difunctional coupling agent; and 3) a poly(tetramethylene glycol) and an alkoxylated amine linked to the poly(tetramethylene glycol) by a difunctional coupling agent.

In a further embodiment the method includes dispersing the demulsifier in a suitable solvent or liquid carrier including, for example, aromatic hydrocarbons, aliphatic hydrocarbons such as kerosene, glycols, glycol ethers, alcohols, water, fatty acid methyl esters, and combinations thereof. The liquid carrier is then applied to the emulsion.

In a further embodiment the emulsion is a water-in-oil emulsion. The demulsifiers of the present invention advantageously demonstrate biodegradation of at least 20% in the marine environment. In an embodiment, the demulsifier exhibits a biodegradation of from about 25% to about 55%. The demulsifiers of the present invention are also low in toxicity. The demulsifiers in the present invention demonstrate toxicity levels (EC50) of greater than 10 mgL$^{-1}$ in tests with various marine species.

Additional features and advantages of the present invention are described in and will be apparent from the following Detailed Description of the Presently Preferred Embodiments.

DETAILED DESCRIPTION OF THE PREFERRED EMBODIMENTS

The present invention generally relates to a petroleum demulsifier (also known as emulsion breakers) for resolving or otherwise "breaking" emulsions that typically form during crude petroleum extraction and/or refinement. As used herein, "emulsions" include water-in-oil emulsions and oil-in-water emulsions. In an embodiment, the demulsifier is a polyester (or polyester polyether) including a poly(tetramethylene glycol) and an alkylene glycol copolymer linked to the poly(tetramethylene glycol) by a difunctional coupling agent. The demulsifier may have the formula:

—[(A-B)$_m$—(C—B)]$_n$— wherein A is the poly(tetramethylene glycol), B is the difunctional coupling agent and C is the alkylene glycol copolymer. The value for m may range from about 0.01 to about 100 and n may be an integer from 1 to about 100. The poly(tetramethylene glycol) A may be present from about 5% to about 90% by weight of the demulsifier, the difunctional coupling agent B may be present from about 1% to about 50% by weight of the demulsifier, and the alkylene glycol copolymer C may be present from about 5% to about 90% by weight of the demulsifier. In an embodiment, A is present from about 35% to about 71% by weight, B is present from about 5% to about 18% by weight and C is present from about 5% to about 53% by weight of the demulsifier.

The poly(tetramethylene glycol) of the present invention may be any linear tetramethylene glycol polymer or linear 4-carbon oxide polymer as is commonly known in the art. Nonlimiting examples of suitable poly(tetramethylene glycol) include poly(tetramethylene oxide), poly(oxytetramethylene), poly(oxytetramethylene) glycol, poly(tetramethylene ether), and poly(tetrahydrofuran).

In an embodiment, the poly(tetramethylene glycol) may be furan tetrahydro polymer or poly(oxy-1,4-butanediyl)-α-hydro-ω-hydroxyl. Such compounds are commonly known as poly(tetrahydrofaran) or poly(THF). A suitable poly(THF) is known under the trademark TERATHANE® and is manufactured by DuPont. TERATHANE® is a blend of linear diols in which the hydroxyl groups are separated by repeating tetramethylene ether groups:

HO(CH$_2$CH$_2$CH$_2$CH$_2$—O—)$_n$H wherein n may be from about 1 to about 100. In an embodiment, n may be from about 9 to about 30. The molecular weight of the poly(tetramethylene glycol) may vary with chain length as is commonly known in the art, with the molecular weigh ranging from about 100 to about 10,000. In an embodiment, the average molecular weight of the poly (tetramethylene glycol) may be from about 600 to about 3,000. In a further embodiment, the average molecular weight of the poly(THF) is about 2,000.

The alkylene glycol copolymer, or poly(alkylene glycol) copolymer, is a copolymer derived from two or more alkylene glycol monomers. Alkylene glycol monomers are olefin oxides and form polymers having the general formula:

where R is an H, CH$_3$, or CH$_2$CH$_3$ radical.

In an embodiment, the alkylene glycol copolymer is composed of monomers selected from ethylene glycol, propylene glycol, and combinations thereof. The monomers may be copolymerized to form a random, an alternating, or a block alkylene glycol copolymer as is commonly known in the art. Nonlimiting examples of suitable alkylene glycol block copolymers include poly(ethylene glycol)-block-polypropylene glycol)-block-poly(ethylene glycol), poly(propylene glycol)-block-poly(ethylene glycol)-block-poly(propylene glycol), poly(propylene glycol)-block-poly(tetrahydrofuran)-block-poly(propylene glycol), and poly(ethylene glycol)-block-poly(tetrahydrofuran)-block-poly(ethylene glycol). The formula for each respective alkylene glycol block copolymer is set forth below. In an embodiment, the alkylene glycol copolymer is a poly(ethylene glycol)-block-polypropylene glycol)-block-polyethylene glycol).

In an embodiment, the alkylene glycol copolymer is a block copolymer of formula:

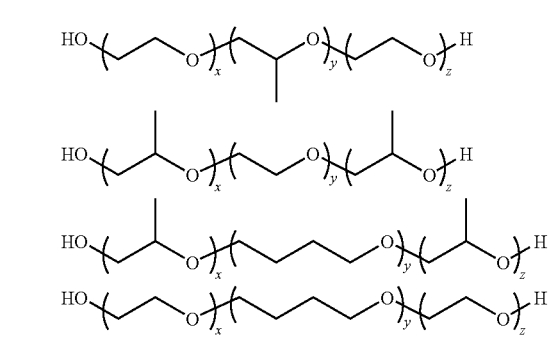

The values for x, y, and z may vary independently and may range from 1 to about 150. In an embodiment, the values for x and z are the same. The values for x, y, and z may be adjusted to alter the molecular weight of the alkylene glycol copolymer which concomitantly alters or varies the oxygen content of the alkylene glycol copolymer as is commonly known in the art. For example, an increase in the molecular weight of the poly(ethylene glycol) moiety typically increases the polarity of the demulsifier. In a further embodiment, the poly (propylene glycol) is present in an amount from about 50% to about 90% by weight of the alkylene glycol copolymer. In yet a further embodiment, the polypropylene glycol) is present in about 50% by weight of the alkylene glycol copolymer. In another embodiment, the alkylene glycol polymer is a poly (ethylene glycol) (see Example 3) and contains 0% PO. Block EO/PO copolymers are commonly known under the trademark PLURONIC®, manufactured by BASF.

The difunctional coupling agent contains two functional groups. The difunctional coupling agent may be a carboxylic diacid (i.e., two carbonyl groups) or a difunctional isocyanate. In an embodiment, the difunctional coupling agent is an aliphatic or aromatic carboxylic diacid having from 1 to about 20 carbon atoms. In a further embodiment the carboxylic diacid is selected from the group consisting of adipic acid, succinic acid, glutaric acid, and terephthalic acid. Alternatively, the acid may be a poly-acid such as a tri-acid or a tetra-acid, for example. Nonlimiting examples of suitable poly-acids include the tri-acid nitrilotriacetic acid, N(CH$_2$CO$_2$H)$_3$ and the tetra-acid EDTA, ethylenediamine tetraacetic acid.

In yet another embodiment, the difunctional coupling agent may be adipic acid and the demulsifier may have the following formula:

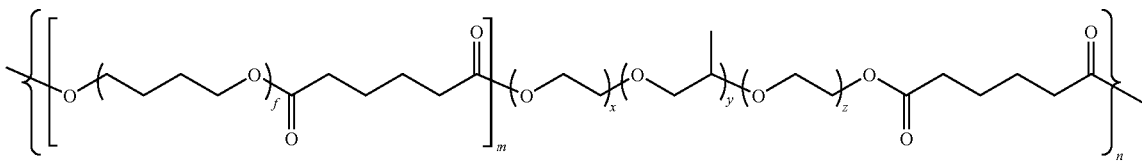

wherein f ranges from about 1 to about 100, m ranges from 1 to about 100, n ranges from 1 to about 100, x ranges from 1 to about 150, y ranges from 0 to about 150, and z ranges from 0 to about 150. The molecular weight of the poly(tetramethylene glycol) may range from about 100 to about 10,000 and the molecular weight of the alkylene glycol copolymer may range from about 100 to about 10,000.

In another embodiment, the difunctional coupling agent may be an aliphatic or an aromatic difunctional isocyanate having from 1 to about 20 carbon atoms to produce a polyurethane demulsifier. In a further embodiment, the difunctional coupling agent may be toluene diisocyanate or hexamethylenediisocyanate. In this embodiment, the demulsifier may have the following formula:

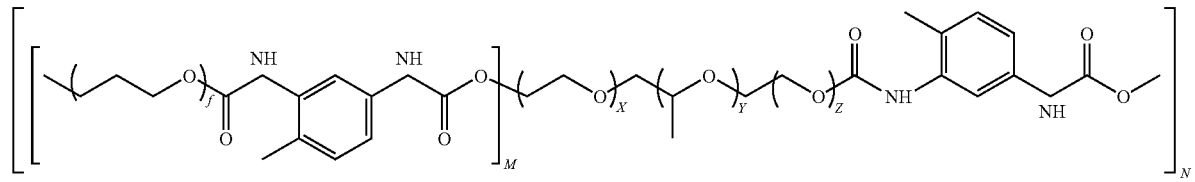

wherein f ranges from about 1 to about 100, M ranges from about 1 to about 100, N ranges from 1 to about 100, X ranges from 1 to about 150, Y ranges from 0 to about 150, and Z ranges from 0 to about 150.

In a further embodiment of the present invention, the alkylene glycol copolymer may also include an alkoxylated amine. The alkoxylated amine may have the following formula:

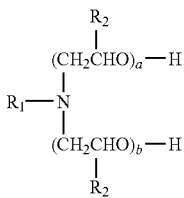

wherein $R_1$ is selected from the group consisting of an alkyl radical having from 1 to about 23 carbon atoms and an alkenyl radical having from 2 to about 23 carbon atoms, $R_2$ is H or $CH_3$ and may take both meanings so that the alkylene glycol moieties may be either poly(ethylene glycol), polypropylene glycol) or a combination of both. The values for a and b may independently range from 1 to about 50. In a further embodiment, $R_1$ may be from about 16 to about 18 carbon atoms, $R_2$ is H and a=8 and b=8.

In this embodiment, the demulsifier includes the poly(tetramethylene glycol) and the alkoxylated amine is linked to the poly(tetramethylene glycol) by the difunctional coupling agent.

The demulsifier has the formula:

$$-[(A-B)_m-(D-B)-]_n-$$

wherein A is the poly(tetramethylene glycol), B is the difunctional coupling agent and D is the alkoxylated amine. The value for m may range from about 0.01 to about 100, and n may be an integer in the range from 1 to about 100. The formula for the alkoxylated amine may be as previously discussed herein. Alternatively, the alkylene glycol moiety may be incorporated within an alkoxylated acceptor/polyol, such as an alkoxylated glycerol or sorbitol, for example.

The difunctional coupling agent may be an aliphatic or aromatic carboxylic diacid having from 1 to about 20 carbon atoms. In a further embodiment, the carboxylic diacid may be adipic acid, succinic acid, glutaric acid and terephthalic acid with adipic acid being preferred. Alternatively, a poly acid such as a tri-acid or a tetra-acid may be used as the coupling agent. In an embodiment, the coupling agent may be adipic acid and the demulsifier has the following formula:

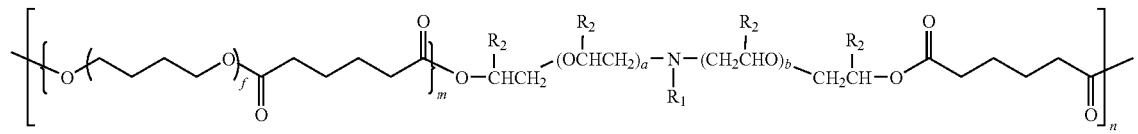

wherein f ranges from about 1 to about 100, m ranges from 1 to about 100 and n ranges from 1 to about 100. The molecular weight of the poly(tetramethylene glycol) may range from about 100 to about 10,000 and the molecular weight of the alkoxylated amine may range from about 100 to about 10,000.

The demulsifier formulations of the present invention demonstrate improved biodegradation characteristics. The skilled artisan will appreciate that biodegradation of a formulation may be determined by such non-limiting testing procedures as OECD 301, 302, or 306 protocols, EU, ISO, EPA, ASTM, and OSPAR. OECD 306 protocol is an accepted method to assess biodegradation of a chemical substance in sea-water. Consequently, biodegradation as herein described is biodegradation as determined by OECD protocol 306. The demulsifiers of the present invention are at least 20% biodegradable in accordance with OECD 306 protocol. In an embodiment, the demulsifier may have a biodegradation from about 25% to about 55% in accordance with OECD 306.

The present invention further contemplates a method for breaking an emulsion comprising oil and water. The method includes contacting the emulsion with any of the demulsifiers as herein described. Consequently, the method may include contacting an emulsion with a demulsifier composed of a poly(tetramethylene glycol) and an alkylene glycol copolymer linked thereto by a difunctional coupling agent as previously described. Alternatively, the method may also include contacting the emulsion with the demulsifier composed of the poly(tetramethylene glycol), and the alkylene glycol copolymer-alkoxylated amine linked to the poly(tetramethylene glycol) by the difunctional coupling agent. Furthermore, the method may include contacting the emulsion with a demulsifier having the poly(tetramethylene glycol), and the alkoxylated amine linked thereto by the difunctional coupling agent.

In a further embodiment, the method includes dispersing the demulsifier in a suitable solvent or liquid carrier. Representative solvents and carriers include aromatic hydrocarbons, aliphatic hydrocarbons such as kerosene, glycols, glycol ethers, alcohols, water, fatty acid methyl esters, and the like or a combination thereof. The liquid carrier may then be applied to the emulsion by any suitable process as is commonly known in the art.

The demulsifier may be used alone or in combination with any of a number of additional demulsifiers known in the art including, but not limited to alkylphenol formaldehyde condensation products such as alkylphenol formaldehyde resin alkoxylates (AFRA), polyalkylene glycols (PAG) including polypropylene glycols (PPG) and cross-linked PPG's, organic sulfonates, alkoxylated alcohols, alkoxylated polyols, fatty acids, complex resin esters, alkoxylated fatty amines, alkoxylated polymeric amines, and the like. The demulsifier may also be used in combination with corrosion inhibitors, viscosity reducers and other chemical treatments used in crude oil production, refining and chemical processing.

The demulsifying formulations of the present invention may be used to prevent, break, or resolve water-in-oil or oil-in-water type emulsions and crude petroleum oil emulsions in particular. The present demulsifiers may also be used to break hydrocarbon emulsions derived from refined mineral oil, gasoline, kerosene, etc. The present demulsifiers may be applied at any point during the petroleum oil extraction and/or production process as is commonly known in the art. For instance, the present demulsifiers may be introduced at the well head, via downhole injection, either continuously or periodically, or at any point between the wellhead and the final oil storage.

By way of example and not limitation, examples of the present invention will now be given.

Example 1

128.1 grams ("g") of poly(tetrahydrofuran) was charged into a suitable reactor and maintained at greater than 70° C. The number average molecular weight of the poly(tetrahydrofuran) was about 2000. Next, 59.0 g of polyethylene glycol)-block-poly(propylene glycol)-block-poly(ethylene glycol) was charged into the reactor. The block copolymer had a molecular weight of about 1900 at about 50% by weight of ethylene oxide ("EO"). Next, 11.4 g of adipic acid was charged into the reactor while stirring vigorously. Then, 1.0 g of p-toluene sulfonic acid was charged into the reactor. The reactor was purged with nitrogen gas under heated at about 170° C. The temperature was maintained at about 170° C. for about 5 hours. The reactor was then cooled to 70° C. and 0.5 g of triethylamine was charged to the reactor. The resultant polyester product was cooled and transferred from the reactor. Biodegradation by OECD 306: 22%.
Toxicity Data:
*Skeletonema costatum* EC50>30 mgL$^{-1}$
Acartia Tonsa EC50>200 mgL$^{-1}$
*Corophium volutator* EC50>2500 mgL$^{-1}$
*Scopthalmus maximus* EC50>1000 mgL$^{-1}$ Example 2

71.02 grams ("g") of poly(tetrahydrofuran) was charged into a suitable reactor and maintained at greater than 70° C. The number average molecular weight of the poly(tetrahydrofuran) was about 640. Next, 105.6 g of poly(ethylene glycol)-block-poly(propylene glycol)-block-poly(ethylene glycol) was charged into the reactor. The block copolymer had a molecular weight of about 1900 at about 50% by weight of ethylene oxide ("EO"). Next, 20.28 g of adipic acid was charged into the reactor while stirring vigorously. Then, 2.0 g of p-toluene sulfonic acid was charged into the reactor. The reactor was purged with nitrogen gas under heated at about 170° C. The temperature was maintained at about 170° C. for about 5 hours. The reactor was then cooled to 70° C. and 1.05 g of triethylamine was charged to the reactor. The resultant polyester product was cooled and transferred from the reactor. Biodegradation by OECD 306: 23%.
Toxicity Data:
*Skeletonema costatum* EC50>600 mgL$_{-1}$
Acartia Tonsa EC50>900 mgL$^{-1}$
*Scopthalmus maximus* EC50>1000 mgL$^-$ Example 3

139.44 grams ("g") of poly(tetrahydrofuran) was charged into a suitable reactor and maintained at greater than 70° C. The number average molecular weight of the poly(tetrahydrofuran) was about 640. Next, 21.82 g of poly(ethylene glycol) was charged into the reactor. The poly(ethylene glycol) had a molecular weight of about 600. Next, 35.04 g of adipic acid was charged into the reactor while stirring vigorously. Then, 1.00 g of p-toluene sulfonic acid was charged into the reactor. The reactor was purged with nitrogen gas under heated at about 150° C. The temperature was maintained at about 150° C. for about 5 hours. The reactor was then cooled to 70° C. and 1.10 g of triethylamine was charged to the reactor. The resultant polyester product was cooled and transferred from the reactor. Biodegradation by OECD 306: 46%.

Toxicity Data:
*Skeletonema costatum* EC50>600 mgL$^{-1}$
*Acartia Tonsa* EC50>500 mgL$^{-1}$
*Scopthalmus maximus* EC50>1000 mgL$^{-1}$ Example 4

142.4 grams ("g") of poly(tetrahydrofuran) was charged into a suitable reactor and maintained at greater than 70° C. The number average molecular weight of the poly(tetrahydrofuran) was about 2000. Next, 10.4 g of poly(ethylene glycol) was charged into the reactor. The poly(ethylene glycol) had a molecular weight of about 600. Next, 32.8 g of poly(ethylene glycol)-block-poly(propylene glycol)-block-poly(ethylene glycol) was charged into the reactor. The block copolymer had a molecular weight of about 1900 at about 50% by weight of ethylene oxide ("EO"). Next, 12.6 g of adipic acid was charged into the reactor while stirring vigorously. Then, 1.26 g of p-toluene sulfonic acid was charged into the reactor. The reactor was purged with nitrogen gas under heated at about 150° C. The temperature was maintained at about 150° C. for about 5 hours. The reactor was then cooled to 70° C. and 0.65 g of triethylamine was charged to the reactor. The resultant polyester product was cooled and transferred from the reactor. Biodegradation by OECD 306: 24%.

Example 5

124.4 grams ("g") of poly(tetrahydrofuran) was charged into a suitable reactor and maintained at greater than 70° C. The number average molecular weight of the poly(tetrahydrofuran) was about 640. Next, 33.94 g of oxyalkylated tallow amine was charged into the reactor. The oxyalkylated primary tallow amine had a molecular weight of about 1000 at about 70% ethylene oxide ("EO"). Next, 35.04 g of adipic acid was charged into the reactor while stirring vigorously. Then, 3.6 g of p-toluene sulfonic acid was charged into the reactor. The reactor was purged with nitrogen gas under heated at about 170° C. The temperature was maintained at about 170° C. for about 5 hours. The reactor was then cooled to 70° C. and 1.87 g of triethylamine was charged to the reactor. The resultant polyester product was cooled and transferred from the reactor. Biodegradation by OECD 306: 52%.
Water Drop Test 1
Performance Data for Polyether Polyester Demulsifier Samples of a crude oil emulsion were placed in graduated prescription bottles and heated to 63° C. in a water bath. The heated samples were treated with 200 ppm by weight of the polyester composition made pursuant to each of Example 1-5 as discussed above. The treated crude samples were then shaken 150 times to mix the additive (i.e., polyester composition) into the crude oil. The samples were then returned to the water bath at 63° C. After 5 minutes, the samples were removed from the water bath. Any free water that has separated from the crude emulsion was then recorded. The sample was then returned to the hot water bath. Free water readings were repeatedly taken at 15 and 60 minutes.

After 60 minutes, a 5 mL sample of the crude oil was taken from a point approximately 15 mL above the level of the free water. The crude sample was diluted with 5 mL hydrocarbon solvent in a graduated centrifuge tube and shaken vigorously. The diluted sample was placed in a centrifuge at high speed for 10 minutes. The centrifuged sample was removed and free water (W) and residual emulsion (BS) levels were then recorded. The results of the Bottle Test are indicated below in Table I.

TABLE I

| Product | Water drop (minutes) | | | Thief Grindout | |
|---|---|---|---|---|---|
|  | 5 | 15 | 60 | B.S. | W |
| Comparative Sample | 0 | 2 | 40 | 3.2 | 7.0 |
| Sample 1 | 8 | 34 | 40 | 1.6 | 8.0 |
| Sample 2 | 2 | 29 | 40 | 2.4 | 7.0 |
| Sample 3 | 31 | 32 | 40 | 2.8 | 5.0 |
| Sample 4 | 6 | 20 | 40 | 2.0 | 7.0 |
| Sample 5 | 2 | 20 | 40 | 1.9 | 9.0 |
| Blank | 0 | 0 | 0 | 4.0 | 36.0 |

As shown in Table I, the polyester composition made pursuant to an embodiment of the present invention displayed effective demulsifier properties based on the Bottle Test. In this regard, crude oil Samples 1-5 were treated with a polyester composition made pursuant to Examples 1-5, respectively. The Bottle Test was also conducted on a blank sample and a comparative crude oil sample that was treated with a commercially available demulsifier.

It should be understood that various changes and modifications to the presently preferred embodiments described herein will be apparent to those skilled in the art. Such changes and modifications can be made without departing from the spirit and scope of the present invention and without diminishing its attendant advantages. It is therefore intended that such changes and modifications be covered by the appended claims.

What is claimed is:
1. A demulsifier comprising a poly(tetramethylene glycol) homopolymer and an alkylene glycol copolymer linked thereto by a difunctional coupling agent, wherein the demulsifier comprises the following formula:

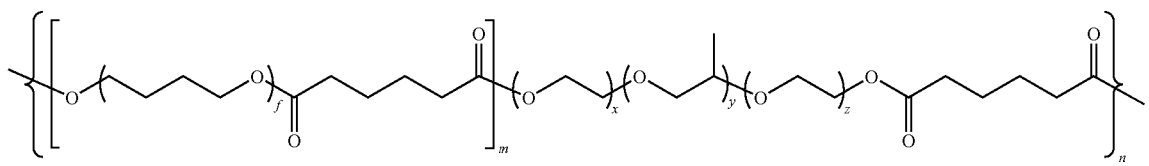

wherein f ranges from about 1 to about 100, m ranges from 1 to about 100, n ranges from 1 to about 100, x ranges from 1 to about 150, y ranges from 0 to about 150, and z ranges from 0 to about 150.

2. The demulsifier of claim 1, wherein the molecular weight of the poly(tetramethylene glycol) is from about 100 to about 10,000 and the molecular weight of the alkylene glycol copolymer is from about 100 to about 10,000.

3. The demulsifier of claim 1, wherein the demulsifier has a biodegradation of at least about 20%.

4. The demulsifier of claim 3, wherein the biodegradation is from about 25% to about 55%.

* * * * *